Sept. 26, 1967  R. E. HENLOTTER  3,343,263
ARTIFICIAL TOOTH
Filed June 14, 1965

INVENTOR.
Richard E. Henlotter
BY
Bernard, McGlynn & Reising
ATTORNEYS 3,343,263
ARTIFICIAL TOOTH
Richard E. Henlotter, 6641 E. Dartmoor Road,
Birmingham, Mich. 48010
Filed June 14, 1965, Ser. No. 463,609
15 Claims. (Cl. 32—10)

This invention relates to artificial teeth, and more particularly to an artificial tooth which is adapted to be inserted in the recess of a gum and jawbone formed by the removal of a natural tooth and to be integrated into the jaw and/or gum structure.

When a natural tooth is removed from the jaw, it is desirable to replace the tooth with an artificial structure. One such means of replacement is accomplished by preparing an artificial tooth, held in place between existing natural teeth by bridgework or the like. Alternatively, an artificial tooth with a root structure may be inserted in the recess left by removal of the natural tooth and which has a crown portion of substantially the same shape and size as the natural tooth and a root structure to anchor the tooth in the jaw and gum. It is well known that if a natural tooth is removed and no replacement is made, the jawbone and gum structure will grow into the recess and completely close up the opening during the healing process. Thus, an artificial tooth which is to be supported in the jawbone and gum structure must be such as to take advantage of the natural healing process to integrate the artificial tooth in the jawbone structure.

Numerous artificial tooth structures are available which are used to replace a natural tooth but which have numerous disadvantages. Chief among these is the tendency for the root portion of the artifiicial tooth to work and move in the jawbone as the tooth is used. This continual working and movement prevents integration of the artificial tooth in the jawbone and leads to looseness, pain, and discomfort and in general an unsatisfactory replacement. Other structures provide holding means mechanically connecting the root portion of the artificial tooth to the jawbone which are extremely complicated and cumbersome to install and which are expensive to manufacture and use.

The device in which this invention is embodied comprises, generally, an artificial tooth having a crown portion which closely approximates the size and shape of the natural tooth removed from the jawbone and a root portion to anchor the tooth in the jaw and/or gum. The root portion is formed of a hollow resilient material and may have the same number of root members as the natural tooth it is to replace, or may be a single root member, and which is filled with a fluid under pressure to force the walls of the root portion against the jawbone and gum structure and prevent the jawbone and gum structure from growing into the recess left by removal of the natural tooth. As the healing process proceeds, the jawbone and gum structure envelop the root portion to hold the tooth in place; yet the force of the fluid under pressure prevents sufficient growth to force the artificial tooth out of the recess. The flexible root walls are easily adaptable to the shape and configuration of the recess. That is, should there be bones or other obstructions in the recess, the root portion will adapt to such obstructions. A crown portion is secured over the root portion, being of substantially the same size and configuration as the natural tooth and being of suitable material to operate as a natural tooth. Disposed in the upper wall of the root portion and enclosed by the crown portion are means for permitting variance in the amount of fluid in the root portion and thus a variance in the pressure exerted on the walls of the root portion against the jawbone and gum structure. Such means permit pressure variance through a suitable aperture formed, when necessary, in the crown portion to alleviate any pain and to assure the proper equilibrium pressure of the fluid against the jawbone and gum structure.

Through the use of an artificial tooth constructed in this manner, complete integration of the artificial tooth into the jawbone and gum structure is accomplished. Whatever spaces not filled by the root portion in the recess left by removal of the natural tooth are filled by the normal growth of the jawbone during the healing process. At the same time, the equilibrium pressure of the fluid within the root portion maintains the artificial tooth firmly in place in the jawbone and gum structure, preventing any working or movement of the artificial tooth as the tooth is used. By providing adjustability in the fluid pressure within the root portion, comfort is maintained and a secure mounting is assured. The artificial tooth may more closely approximate the structure, function, and operation of the natural tooth both in its securement in the jawbone and gum structure and in its operation as a portion of the jaw. It will be apparent that the structure may incorporate several artificial teeth and their root portions suitably linked together, should a number of adjacent natural teeth be removed.

These and other advantages will become more apparent from the following description and drawing in which.

Figure 1:
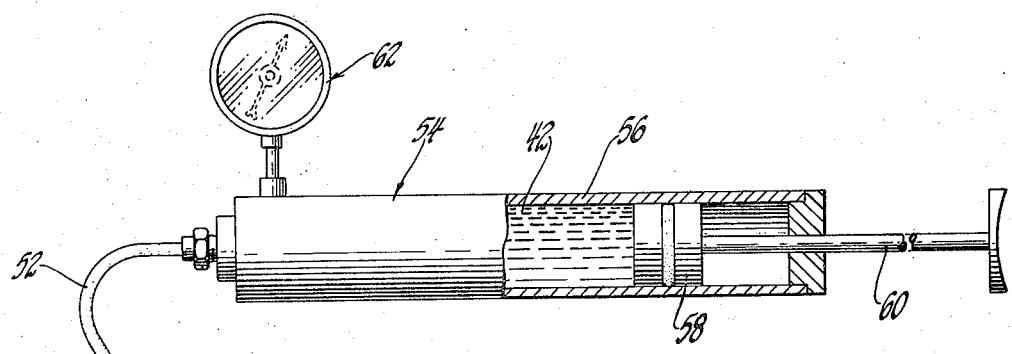
FIGURE 1 is a view with parts broken away and in section to illustrate the mounting of an artificial tooth embodying the invention in the jawbone and gum structure, and further illustrating a means by which the artificial tooth is provided with proper fluid pressure.
Figure 2:
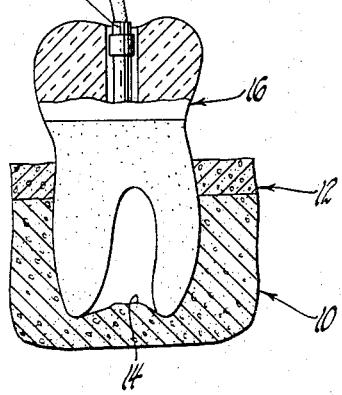
FIGURE 2 is an enlarged view of the artificial tooth shown in FIGURE 1 with parts broken away and in section to illustrate one form of fluid pressure adjustability means.
Figure 2:
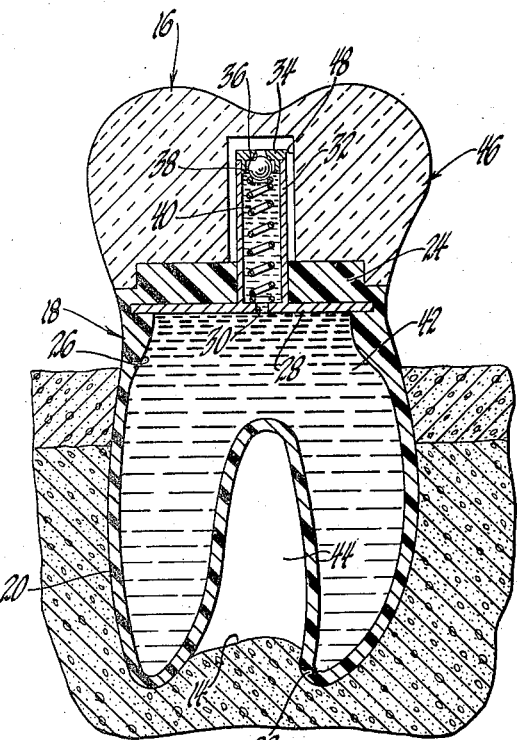

Referring more particularly to the drawings, FIGURES 1 and 2 illustrate a preferred embodiment of the artificial tooth structure. A jawbone, illustrated generally by the numeral 10 surmounted by a gum, illustrated generally by the numeral 12, are shown having a recess 14, which recess is left after removal of a natural tooth. Within this recess, the artifical tooth, illustrated generally by the numeral 16, is mounted in a manner to become hereinafter more apparent.

It is to be understood that the hereinafter described tooth structure is not limited to a particular type of tooth, that is, molar, canine, cuspid, or biscuspid, nor to a particular root structure associated with a particular type of tooth. For example, the molars are known to have two or three member roots embedded in the jawbone and gum structure, and other teeth are known to have double or single root members embedded in the jawbone and gum structure. The artificial tooth embodying this invention is applicable to any root configuration or any crown configuration, and for convenience the following description is directed to a root structure having two root members embedded in the jawbone and gum structure. If the natural tooth removed has a single root member or triple root members, it may be desirable that the root portion of the articficial tooth to replace the natural tooth have a root portion which approximates as closely as possible the root portion of the natural tooth. However, this is not mandatory, it being sufficient to provide a single member root portion for any artifical tooth.

As illustrated in the drawing, the root portion, illustrated generally by the numeral 18 of the artificial tooth 16, has two root members 20 and 22 depending from a thickened body structure 24. The figures show a multiple member root portion which is only representative of various configurations. Root portion 18 is hollow to provide a central cavity 26. Thus, the root members 20 and 22 are defined by relatively thin side walls. The root portion 18 is formed of a suitable plastic material and the walls about the cavity 26 are of sufficient resilience to permit an amount of expansion or deformation in the process of mounting the artificial tooth 16 in the jawbone and the gum structure. Such plastic material must also be adaptable to sterilization and must be nontoxic and noncorrosive so as to be compatible with the jawbone and gum structure. Further, the resilience or elasticity of the walls of the root portions may be varied to permit greater expansion of portions thereof and provide a wedging effect in the recess to aid in retaining the artificial tooth in place.

In one embodiment of the invention, as illustrated in FIGURE 2, a plate member 28 is disposed in the body portion 24 of the root portion 18 in any suitable manner, as by molding the plate portion 28 in the structure when it is formed. Plate 28 is provided with a central aperture 30 above which extends a cylindrical member 32 closed at its top by a cap 34 having an aperture 36 formed therein. Cap 34 may be secured in the cylindrical member 32 in any suitable manner. Disposed within the cylindrical member 32 is a ball check value structure including a ball 38 of sufficient size to close the aperture 36 in the end cap 34. A suitable spring 40 biases the ball 38 against the end cap 34 and closes the aperture 36.

When the root portion 18 is mounted in the recess 14 in the jawbone and gum structure 10–12, the cavity 26 is filled with a suitable fluid 42 through the cylindrical member 32 to a predetermined pressure. Under such pressure, the fluid forces the walls of the root members 20 and 22 outwardly against the jawbone 10 and gum 12 and if properly pressurized will prevent the jawbone 10 and gum 12 from growing into the recess 14 during the natural healing process. The pressurizing fluid is maintained at an equilibrium pressure to approximate the pressure on the jawbone and gum structure created by the root portion of the natural tooth. Any voids left by difference in shape between the artificial root portion 18 and the natural root portion, such as the volume indicated in FIGURE 2 by the numeral 44, will eventually be filled by the natural growth of the jawbone 10 during the healing process. Such growth is impeded by the pressure of the fluid 42 within the cavity 26 so that when all of the volume 44 is filled, the jawbone growth will cease.

Secured to the root portion 18 is a crown member, illustrated generally by the numeral 46, which is formed of a suitable material approximating that of a natural tooth. Such materials are well known in the art, and any such material may easily be adapted to this use. Crown portion 46 is so formed as to approximate the structure of the natural tooth crown portion and to cooperate with the adjacent teeth in the jaw and the opposing teeth in the opposte jaw. The crown portion 46 is secured to the root portion 18 in any suitable manner and is provided with a cylindrical bore 48 which receives the cylindrical member 32 of the valve structure. Bore 48 termintes below the upper surface of the crown portion 46 in the initial stage. Should it become necessary at a later time to vary the pressure of the fluid 42 within the root portion 18, the crown portion 46 may be drilled or otherwise opened, to open communication to the bore 48 and thus to the valve structure. By thus having access to the ball 38 through an aperture in the crown portion 46 and through the aperture 36 in the end cap 34, the fluid in the root portion 18 may be either increased or decreased to vary the pressure.

FIGURE 1 illustrates a method by which the fluid in the root portion 18 may be increased. Following the drilling or like operation to open the bore 48, a suitable adapter 50 mounted on the end of a flexible conduit 52 may be inserted over the cylindrical member 32 and at the same time depress the ball 38 against the force of spring 40. A syringe-type device, illustrated generally by the numeral 54, is suitably attached to the opposite end of flexible conduit 52. Device 54 includes a cylinder 56 having a piston 58 slidably mounted therein and actuated by a push rod 60. Fluid 42 fills the cylinder 56 below the piston 58 so that when the piston 58 is moved toward the left, as viewed in FIGURE 1, the fluid 42 will be introduced into the root portion 18 through the valve structure in the crown portion 46. A suitable pressure indicating device 62 may be provided on the structure 54 to indicate the amount of pressure of the fluid in the system.

It is to be understood that pressure release is accomplished in substantially the same manner, it being only necessary to depress the ball 38 against the spring 40 to permit a portion of the fluid 42 to escape from the root portion 18.

Figure 3:
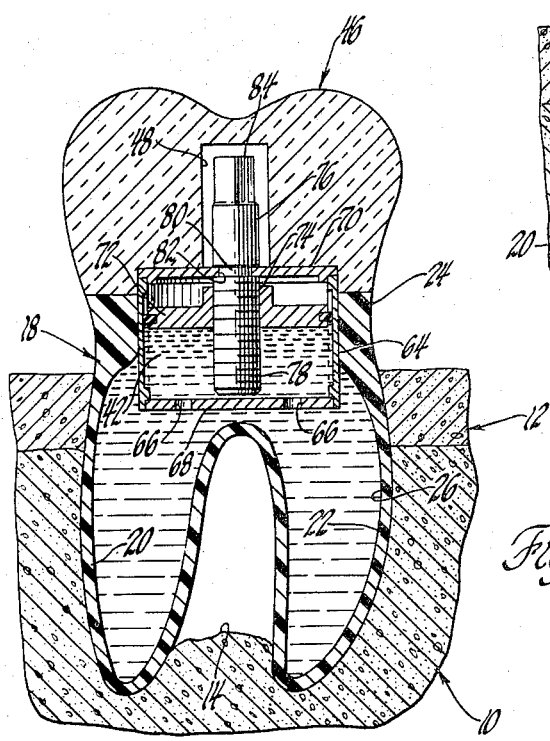
FIGURE 3 is a view similar to FIGURE 2 with parts broken away and in section illustrating a modified form of means for maintaining the fluid pressure.

Another preferred modification of the artificial tooth structure is illustrated in FIGURE 3. Like reference numerals indicate similar parts, and a root portion 18 is mounted in a recess 14 in jawbone 10 formed by removal of the natural tooth. The crown portion 46 approximates the crown portion of the natural tooth and the root members 20 and 22 may approximate the root structure of the natural tooth. In this embodiment, a cylinder 64 is mounted in the body portion 24 of root portion 18 and is provided at the lower end thereof with apertures 66 communicating with the interior of the root portion 18. End plate 68 containing the apertures 66 is secured to the cylinder 64 in any suitable manner. At the opposite end of cylinder 64 is an upper end plate 70 also secured in a suitable manner. Within cylinder 64 is a piston 72 slidable to vary the amount of fluid 42 in the cylinder. It is evident that by movement of the piston in a downward direction, more fluid will be admitted to the cavity 26 in the root portion 18. By upward movement of the piston 72, the overall volume will be increased and fluid will flow from the cavity 26 in the root portion 18 into the cylinder 64.

Piston 72 is provided with a central threaded aperture 74 which receives a stud 76 having a mating threaded end 78. Stud 76 is provided with a portion of reduced diameter 80, which is received in a similarly sized aperture 82 formed in upper end plate 70. Extending upwardly from the end plate 70 the shank of stud 76 terminates in a suitable wrenching shape 84 to which a suitable tool may be attached. Upon rotation of stud 76, the piston 72 will be caused to move upwardly or downwardly in the cylinder 64 to vary the amount of fluid in the cylinder and thus the pressure of the fluid within the root portion 18. A similar bore 48 is formed in the crown portion 46 and terminates close to the surface thereof. When the need arises to vary the pressure in the root portion 18, the crown portion 46 is drilled or otherwise opened and access is had to the stud 76 for variation in piston position.

Thus, an artificial tooth structure is provided which is fully integrated into the jawbone and gum structure as the healing process of the jawbone and gum structure takes place. The artificial tooth is pressurized to maintain an equilibrium pressure against the growth of the jawbone structure and closely approximates the action of a natural root portion in maintaining itself within the jawbone. As so mounted, the artificial tooth will not work or move within the recess formed in the jawbone structure, thus permitting complete integration and preventing the disadvantages of pain, discomfort, and possibilities of the artificial tooth from working loose.

It will become apparent after having had reference to the foregoing description and drawing that numerous modifications and alterations in the structure will occur to those having ordinary skill in the art. However, it is not intended to limit the scope of the invention by the foregoing description and drawing, but by the scope of the appended claims in which—

The embodiments of the invention in which an exclusive property or privilege is claimed are defined as follows:

1. An artificial tooth comprising:
    a hollow root portion having resilient side walls adapted to be received in the recess in the gum and jawbone left by removal of the natural tooth;
    a fluid in said root portion under a predetermined pressure to force said side walls of said root portion outwardly against the jawbone and gum to prevent the jawbone and gum from growing into the recess left by removal of the natural tooth;
    means at least partially in said root portion to permit varying the pressure of said fluid;
    and a crown portion secured to said root portion and enclosing said means.

2. The artificial tooth set forth in claim 1 wherein said means permitting variation in the pressure of said fluid includes a valve.

3. The artificial tooth set forth in claim 1 wherein said means permitting variation in the pressure of said fluid includes a cylinder extending upwardly from said root portion and having an opening at each end thereof, one of said openings communicating with the interior of said root portion, and spring biased valve means closing the other of said openings.

4. The artificial tooth set forth in claim 1 wherein said means permitting variation in the pressure of said fluid includes a cylinder secured in said root portion and communicating with the interior of said root portion, a piston in said cylinder, and means for varying the position of said piston in said cylinder whereby the volume in said cylinder and the pressure of said fluid may be varied.

5. The artificial tooth set forth in claim 1 wherein the elasticity of the walls of said root portion varies to permit parts thereof to expand under the pressure farther than other parts and provide wedge means for additionally retaining said artificial tooth in said jawbone and gum.

6. An artificial tooth comprising:
    a root portion formed of a resilient material and having a cavity therein, said root portion being receivable in the recess in the jawbone and gum left by removal of the root portion of a natural tooth;
    a fluid in said cavity in said root portion under a predetermined pressure to force the walls of said root portion outwardly against the jawbone and gum and prevent the jawbone and gum from growing into the recess left by removal of the natural tooth;
    means at least partially in said root portion to permit additional pressurizing of said fluid or to permit reduction in pressure of said fluid to maintain a predetermined pressure against said jawbone and gum;
    and a crown portion secured to said root portion and enclosing said means.

7. The artificial tooth set forth in claim 6 wherein said means permitting variation in the pressure of said fluid includes a valve.

8. The artificial tooth set forth in claim 6 wherein said means permitting variation in the pressure of said fluid includes a cylinder extending upwardly from said root portion and having an opening at each end thereof, one of said openings communicating with the interior of said root portion, and spring biased valve means closing the other of said openings.

9. The artificial tooth set forth in claim 6 wherein said means permitting variation in the pressure of said fluid includes a cylinder secured in said root portion and communicating with the interior of said root portion, a piston in said cylinder, and means for varying the position of said piston in said cylinder whereby the volume in said cylinder and the pressure of said fluid may be varied.

10. The artificial tooth set forth in claim 6 wherein the elasticity of the walls of said root portion varies to permit parts thereof to expand under the pressure farther than other parts and provide wedge means for additionally retaining said artificial tooth in said jawbone and gum.

11. An artificial tooth comprising:
    a hollow root portion having resilient side walls, said root portion adapted to be received in the recess in the gum and jawbone left by removal of the natural tooth;
    a fluid in said root portion under a predetermined pressure to force said side walls of said root portion outwardly against the gum and jawbone to prevent the gum and jawbone from growing into the recess left by removal of the natural tooth;
    a check valve mounted in said root portion and communicating with the interior thereof, said valve being operable to permit addition or removal of fluid from said root portion to change the pressure of the fluid therein;
    and a crown portion secured to said root portion and enclosing said valve.

12. The artificial tooth set forth in claim 11 wherein the elasticity of the walls of said root portion varies to permit parts thereof to expand under the pressure farther than other parts and provide wedge means for additionally retaining said artificial tooth in said jawbone and gum.

13. An artificial tooth comprising:
    a hollow root portion having resilient side walls and approximating the shape of the root portion of a natural tooth, said root portion adapted to be received in the recess in the gum and jawbone left by removal of the natural tooth;
    a fluid in said root portion under a predetermined pressure to force said side walls of said root portion outwardly against the gum and jawbone to prevent the gum and jawbone from growing into the recess left by removal of the natural tooth;
    a cylinder mounted in said root portion and having openings communicating with the interior thereof and containing a portion of said fluid;
    a piston slidable in said cylinder to vary the volume of fluid therein and increase or decrease the volume of fluid in said root portion to vary the pressure on said side walls;
    means operably connected to said piston to slide said piston in said cylinder;
    and a crown portion secured to said root portion and enclosing said means, said crown portion being adapted to have a part thereof removed for access to said means.

14. The artificial tooth set forth in claim 13 wherein the elasticity of the walls of said root portion varies to permit parts thereof to expand under the pressure farther than other parts and provide wedge means for additionally retaining said artificial tooth in said jawbone and gum.

15. A method of mounting an artificial tooth in a recess left in the gum and jawbone by removal of a natural tooth comprising the steps of:
    placing a hollow resilient root portion in the recess;
    admitting a fluid under pressure into said hollow root portion to force said walls of said root portion against the gum and jawbone to prevent the gum and jawbone from growing into said recess;
    and securing a crown portion approximating the shape of the crown portion of the natural tooth to said root portion.

References Cited

UNITED STATES PATENTS 2,721,387  10/1955  Ashuckian _____ 32—10
2,857,670  10/1958  Kiernan _____ 32—10

RICHARD A. GAUDET, *Primary Examiner.*

ROBERT E. MORGAN, *Examiner.*